United States Patent [19]

Zander

[11] 4,259,714

[45] Mar. 31, 1981

[54] FREQUENCY CONVERTER WITH AN INTERMEDIATE D-C LINK

[75] Inventor: Hans-Hermann Zander, Erlangen, Fed. Rep. of Germany

[73] Assignee: Siemens Aktiengesellschaft, Munich, Fed. Rep. of Germany

[21] Appl. No.: 57,021

[22] Filed: Jul. 12, 1979

[30] Foreign Application Priority Data

Jul. 19, 1978 [DE] Fed. Rep. of Germany ....... 2831752

[51] Int. Cl.³ ............................................ H02M 5/45
[52] U.S. Cl. ....................................... 363/37; 363/138
[58] Field of Search ..................... 363/37, 96, 135–138

[56] References Cited

U.S. PATENT DOCUMENTS 4,056,766  11/1977  Zander ................................... 363/37

FOREIGN PATENT DOCUMENTS 1638545  8/1970  Fed. Rep. of Germany ............. 363/37
2513211  9/1976  Fed. Rep. of Germany ............. 363/37
2304207  10/1976  France ...................................... 363/37

*Primary Examiner*—William M. Shoop
*Attorney, Agent, or Firm*—Kenyon & Kenyon

[57] ABSTRACT

A static frequency converter comprising an intermediate DC voltage link, a rectifier, and an inverter having main thyristors in a bridge circuit, across which bypass diodes in a bridge circuit are shunted antiparallel, has a quenching circuit shunted across each bridge arm which includes a quenching thyristor, a commutating capacitor, and a commutating choke. There is a common commutating capacitor for each two bridge arms having a common main terminal and an energy-removing device, assigned to each commutating choke, is connected after the potential change has occurred at the corresponding output terminal of the inverter, at the end of each commutation. Energy stored in the commutating choke is taken out by the energy-removing device and over-voltage of the commutating capacitors is prevented.

9 Claims, 14 Drawing Figures

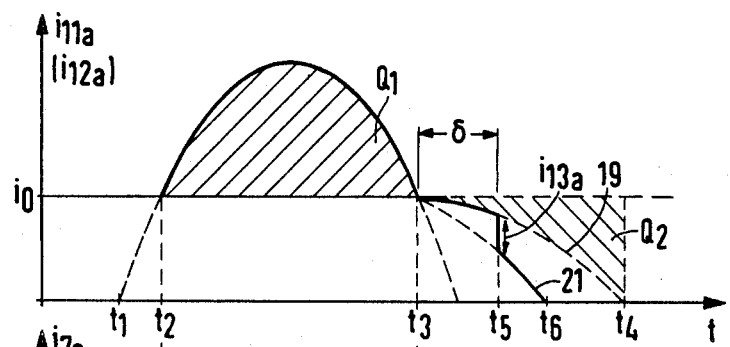
FIG 2a
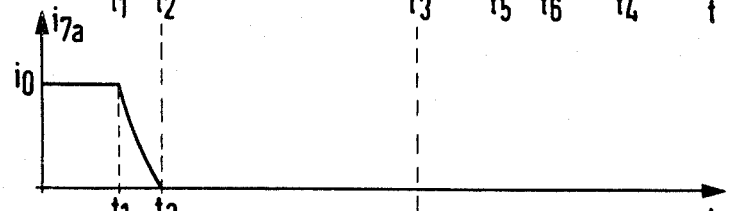
FIG 2b
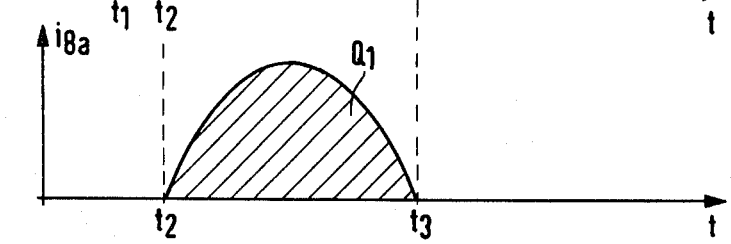
FIG 2c
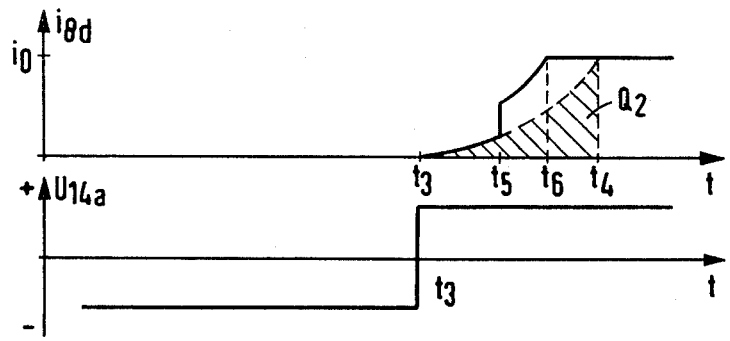
FIG 2d
FIG 2e
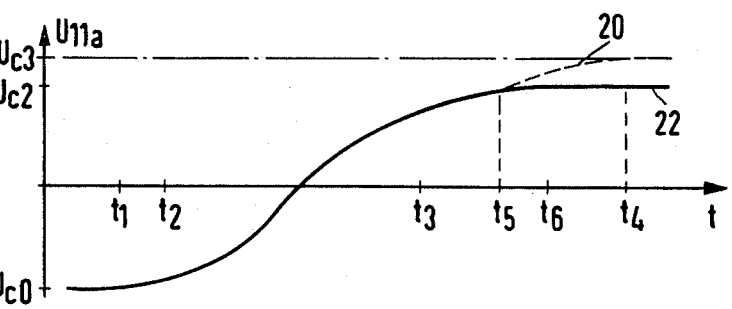
FIG 2f

FREQUENCY CONVERTER WITH AN INTERMEDIATE D-C LINK

BACKGROUND OF THE INVENTION

1. Field of the Invention

This invention relates to a static frequency converter having an intermediate DC voltage link, a rectifier, and an inverter with main thyristors in a bridge circuit which are shunted antiparallel by bypass diodes in a bridge circuit. Each bridge circuit is shunted by a quenching circuit having a quenching thyristor, a commutating capacitor, and a commutating choke, and a common commutating capacitor is provided for every two bridge arms with a common main terminal and in which a device for limiting the current-dependent recharging is used.

2. Description of the Prior Art

Such a converter is described in German Pat. No. 2 510 357.

Depending on whether an uncontrolled or a controlled rectifier is employed, such converters have constant or variable intermediate-link voltages. They are used frequently, because of their simple concept, for supplying three-phase machines. To make up for commutation losses after each forced commutation, the commutating capacitor in these converters is recharged with energy from the load current stored in the commutation inductance and from the energy of the intermediate link. Thus, the ability to commutate at different intermediate-link voltages and different load currents is assured. For large load currents, however, and, in particular, in the event of overloading the converter, this current-dependent recharging can lead to a considerable increase of the voltage at the commutating capacitor, i.e., of the commutation voltage, and can thus bring about the danger of undue stress on the thyristors, diodes and capacitors. This danger exists particularly in the case of high power ratings of, for instance, 100 kVA and more.

According to the above-mentioned German Pat. No. 2 510 357, this danger can be countered by providing at least one damping capacitor, which is shunted across one bridge arm, for each two bridge arms having a common main terminal. Thereby, the time needed for load-current-dependent recharging of the commutating capacitor is reduced, for each commutation, by a time interval in which the damping capacitors participating in the commutation process are discharged or recharged. In this way, peaking of the commutation voltage is prevented, almost without losses. However, the method of the abovementioned patent can only be used in inverter circuits without blocking voltage.

The problem, then, is to provide a frequency converter of the type mentioned above in which unduly high commutation voltages can be avoided in inverter circuits with, as well as without, blocking voltage.

SUMMARY OF THE INVENTION

According to the invention, this problem is solved by using, as the device for limiting the current-dependent recharging, an energy-removing device, which is associated with each commutating choke and which is connected, after the potential reversal at the end of each commutation occurs, to the corresponding output terminal of the inverter.

Part of the energy stored in the commutation choke is thus led off during the current-dependent recharging of the commutating capacitor. The removed energy can be apportioned by timing the instant of connecting the energy-removing device. The energy build-up in the commutating choke can therefore be influenced during the current-dependent recharging so that unduly high commutation voltages at the commutating capacitor are avoided.

In one energy-removing device, according to the present invention, a series circuit consisting of an ohmic resistor and a controlled valve is shunted across each commutating choke. The controlled valve is arranged so that its forward direction is opposed to the direction of current flow which occurs in commutation of the commutating choke. Energy removal from the commutating choke is accomplished, in this case, by properly timed connection of the ohmic resistor, converting part of the energy stored in the commutating choke into thermal energy and thereby removing it from the commutating choke.

In another energy-removing device, a serier circuit consisting of a constant voltage sink and a controlled valve is shunted across each commutating choke. The controlled valve is arranged so that its forward direction is opposed to the direction of current flow during commutation in the commutating choke. Upon connection, during current-dependent recharging, the excess energy from the commutating choke is absorbed by the constant-voltage sink. Such a constant-voltage sink can be, for instance, a storage battery.

Another energy-removing device, which is also shunted across each commutating choke, is a series circuit consisting of a current transformer and a controlled valve. The controlled valve is arranged so that its forward direction is opposed to the direction of current flow occurring in the commutating choke during commutation; the secondary winding of the current transformer is connected to the intermediate DC voltage link via a rectifier arrangement. In this case, the excess energy of the commutating choke is fed back into the intermediate DC link during a predeterminable time interval while current-dependent recharging is in progress. Overcharging the commutating capacitor is thereby prevented without losses.

It is advantageous, for controlling connection of the energy-removing device, to connect to each output terminal of the inverter a pickup device, which delivers a reference signal upon the potential change occurring at the output terminal at the end of each commutation, and to provide a control unit for the controlled valves for delivering a firing pulse to the controlled valve associated with a commutating choke participating in the commutation process, when the reference signal has been received. The potential change at an output terminal, signaled by delivering a reference signal from the pick-up device, marks the start of current-dependent recharging. From this time one, removal of energy stored in the commutating choke can be started by supplying a firing pulse to the controlled valve of the energy-removing device. By shifting the firing instant relative to the reference signal which signals the beginning of current-dependent recharging, the amount of electric energy stored in the commutating choke removed or converted into thermal energy can be influenced.

In a converter having a common commutating choke for each two bridge arms having a common main terminal, it has been found advantageous for the energy-removing device to contain two controlled valves arranged antiparallel to each other. One of the two antiparallel controlled valves is assigned to each direction of flow of the commutation current. The energy-removing portion of this device, i.e., for instance, the ohmic resistor, can be used for both directions of flow of the commutation current.

In a converter having an additional choke connected between each common main terminal of two main thyristors and the corresponding main terminals of two bypass diodes each, it is advantageous for the energy-removing device to shunt the additional choke as well as the commutating choke. This way, the energy content of the additional choke, which furnishes a blocking voltage for the main thyristor to be quenched, can also be taken down during current-dependent recharging.

In a converter having a rectifier which can be controlled and in which each quenching circuit includes a commutating choke of its own and another choke is arranged between each main thyristor and the associated bypass diode, it is advantageous to shunt the energy-removing device across the additional choke as well as the commutating choke. In this converter circuit, also, where there is blocking voltage because of the further choke, the energy content of the commutating choke as well as that of the additional choke of each commutating circuit can be taken down by switching on the controlled valve.

In one preferred embodiment, a load current transformer is provided, the rectified output signal of which, developed across a load, is processed in the drive unit in such a way that the time interval between the reference signal and the firing pulse increases as the load current decreases. This measure is particularly important in converters having variable intermediate link voltages, since charging of the commutating capacitor, which can be regulated and adapted to the different operating conditions, can be obtained. Overcharging of this capacitor is avoided by appropriate choice of the time interval between the arrival of the reference signal and the triggering of the firing pulse to limit the commutation voltage at the commutating capacitor so that only the necessary voltage is reached.

BRIEF DESCRIPTION OF THE DRAWINGS

FIGS. 2a–2f illustrate waveforms occurring during the commutating process as a function of time;

DETAILED DESCRIPTION OF THE INVENTION

Figure 1:
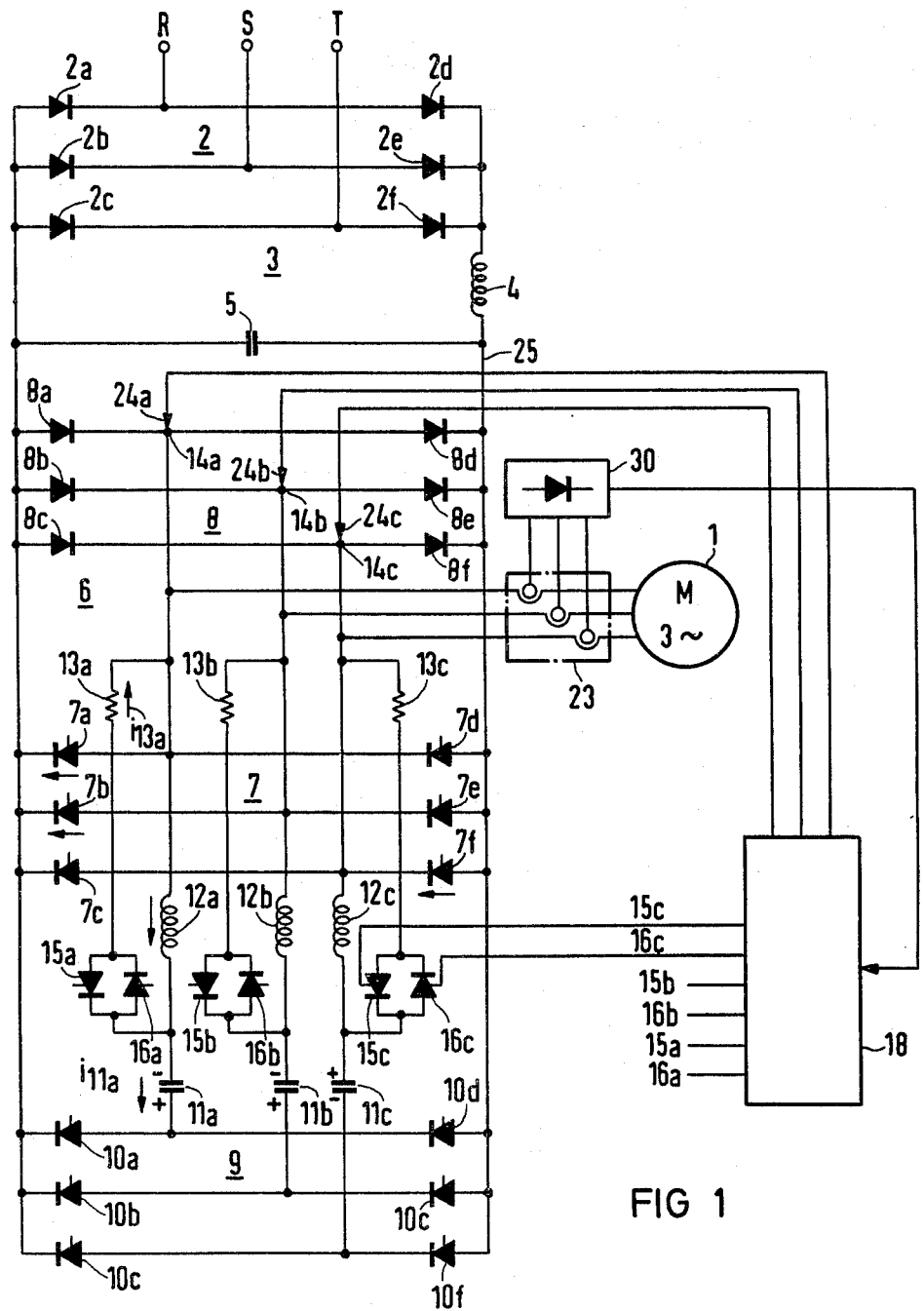
FIG. 1 is a schematic diagram of the invention as embodied in a commutated converter circuit using resistors as the energy removing device.

FIG. 1 shows a first illustrative embodiment of a converter, according to the invention, in which a three-phase machine 1 is the load being supplied from a three-phase network having phases R, S, T. The converter comprises an uncontrolled rectifier 2, an intermediate DC voltage link 3 with a smoothing choke 4 and intermediate link capacitor 5, and a self-commutating, externally controlled inverter 6. In this embodiment, rectifier 2 employs six diodes 2a to 2f, in a three-phase bridge circuit. For a controlled rectifier, the diodes 2a to 2f would have to be replaced by thyristors. Inverter 6 consists of main thyristors 7a to 7f, in three-phase bridge circuit 7, and bypass or back-current diodes 8a to 8f, in three-phase bridge circuit 8. The two bridge circuits 7 and 8 are connected antiparallel to each other, so that one each of diodes 8a to 8f is connected antiparallel to one each of main thyristors 7a to 7f.

Inverter 6 is provided with a forced commutation circuit 9 for main thyristors 7a to 7f, in which each main thyristor 7a to 7f is shunted by a series-connected quenching circuit consisting of one each of quenching thyristors 10a to 10f, one each of commutating capacitors 11a to 11c, and one each of the commutating chokes 12a to 12c. A common commutating capacitor 11a to 11c and a common commutating choke 12a to 12c are provided for the paired bridge arms containing main thyristors 7a and 7d, 7b and 7e, and 7c and 7f having common main terminal 14a to 14c, respectively. Such bridge arms, having a common main terminal 14a to 14c, are also called bridge legs.

Each commutating choke 12a to 12c is shunted by a series circuit consisting of an ohmic resistor 13a to 13c and two antiparallel controlled valves 15a, 16a to 15c, 16c, respectively. In the illustrative embodiment the controlled valves are thyristors.

After current-dependent recharging has begun, part of the commutation current flowing through a given commutating choke during the commutation process is branched off by connecting the associated controlled valve through one of the ohmic resistors 13a to 13c, and is converted into thermal energy. Controlled valves 15a, 16a to 15c, 16c are switched on by control unit 18. For the sake of clarity, only the control lines leading to controlled valves 15c and 16c are shown in the illustrative embodiment. The beginning of current-dependent recharging, after which one of the controlled valves 15a, 16a to 15c, 16c can be switched on at the earliest, is determined by pickup devices 24a to 24c from the potential change at main terminals 14a to 14c and reported by delivery of a reference signal to control unit 18. Control unit 18 sends a firing pulse to one of the controlled valves, with more or less delay, after a reference signal has been received. The delay depends on load current conditions and the intermediate link voltage. For a high intermediate-link voltage and large load currents, there is danger that the commutating capacitors 11a to 11c, which participate in the commutation process, might get overcharged during the current-dependent recharging. In that case, the firing pulse for the associated controlled valve is delivered without delay after the reference signal is received, so that, for the entire duration of current dependent recharging, part of the current flowing through a commutating choke 12a to 12c is conducted off via one of the ohmic resistors 13a to 13c and is thereby removed from the process which causes charge reversal of a commutating capacitor 11a to 11c.

The inverter 6 itself, and quenching thyristors 10a to 10f are controlled, in a manner well known in the art, by a control unit which contains a pulse generator followed by a ring counter. To preserve the clarity of presentation, the control units and the control lines to the control electrodes of the thyristors are not shown.

To put the converter into operation, commutating capacitors 11a to 11c must be charged to the voltage necessary for commutating the starting current; for charging, the main thyristors 7a to 7f and the corresponding quenching thyristors 10a to 10f are fired. In the alternative, a conventional recharging device, not shown in the drawing, can be provided for each commutating capacitor, which contains, for instance, a series circuit consisting of a charging resistor and a switch through which the associated commutating capacitor can be connected to DC voltage source; when charging has been completed, the switches are opened again.

The forced commutation will be described with reference to FIGS. 2a to 2f, in which the currents and voltages related to the commutation process are plotted against the time t. In FIGS. 2a and 2f, the dashed lines 19 and 20 show the current and voltage which would occur in the commutation process of a converter without a device for limiting the current-dependent recharging. The waveshapes of current and voltage curves 21 and 22, shown in solid lines, are indicated for a converter according to the invention. It is assumed in the following: that commutating capacitors 11a to 11c are charged with the polarity shown to the voltage $U_{c0}$; that main thyristors 7a, 7b and 7f carry current; and that the load current is to be commutated from main thyristor 7a to main thyristor 7d. With the indicated charge on commutating capacitors 11a to 11c, main thyristors 7a and 7b of the left bridge half can be force-commutated.

To extinguish the current-carrying main thyristor 7a, the associated quenching thyristor 10a is fired at time $t_1$. The discharge current $i_{11a}$ of commutating capacitor 11a now flows via the quenching thyristor 10a, main thyristor 7a and commutating choke 12a and takes down the load current $i_o$ in main thyristors 7a (FIG. 2b). When discharge current $i_{11a}$ reaches the load current level $i_o$ in main thyristor 7a, then main thyristor 7a is extinguished at time $t_2$. The load current $i_o$ continues to flow via commutating choke 12a, commutating capacitor 11a, and quenching thyristor 10a. The charge on commutating capacitor 11a is now reversed via quenching thyristor 10a, bypass diode 8a, and commutating choke 12a. The current through bypass diode 8a is shown in FIG. 2c. The charge $Q_1$ transported thereby corresponds to the charge $Q_1$ in FIG. 2a, which is enclosed between the load current line $i_o$ and the discharge current line $i_{11a}$ belonging to capacitor. In the resonant circuit formed by commutating capacitor 11a, commutating choke 12a, quenching thyristor 10a and bypass diode 8a, the reversal current $i_{11a}$ of commutating capacitor 11a increases sinusoidally to its maximum value, which is reached at the zero crossing of capacitor voltage $U_{11a}$. The reversal current, which is now driven through commutating choke 12a, then decreases again. As soon as the reversal current has reached the magnitude of the load current $i_o$, at time $t_3$, bypass diode 8d starts to conduct and takes over an increasing portion of the current, as is shown in FIG. 2d. With the conduction of bypass diode 8d, the potential of main terminal 14a changes from minus to plus at time $t_3$, as shown in FIG. 2e. At this point in time, a modified oscillation process beings, incorporating the intermediate-link voltage and having the voltage $U_{c2}$ at commutating capacitor 11a and the current value $i_o$ as the starting oscillation, the tuned circuit now contains an impressed voltage of the magnitude of the intermediate-link voltage. Therefore, a current, which is likewise driven by commutating choke 12a, flows through commutating capacitor 11a to bypass diode 8d, during the cummutation, and has a waveform corresponding to the dashed curve 19 in FIG. 2a; this results in a voltage waveform at commutating capacitor 11a like that shown by dashed curve 20 in FIG. 2f. The voltage at commutating capacitor 11a therefore rises from $U_{c2}$ to $U_{c3}$ according to the curent-time area $$\int_{t_3}^{t_4} i_{11a}\, dt \; (t_4 = \text{instant of the current zero crossing}),$$

which corresponds to accurent-dependent recharging of commutating capacitor 11a by commutating choke 12a. In the steady-state case, we have $U_{c3}=U_{c0}$, where $U_{c0}$ is the starting voltage of commutating capacitor 11a prior to the start of the commutation process and which is adequate for proper commutation. With this current-dependent recharging of commutating capacitors 11, which makes up for commutation losses, the converter operation is assured when the intermediate-link voltages are low. For large load current, however, the commutation voltage becomes larger than for small load currents. In the event of an overload of the converter, this current-dependent recharging can therefore lead to unduly high commutation voltages, so that damage to the components of inverter 6 can occur. When commutation to bypass diode 8d is completed, quenching thyristor 10a is extinguished and commutating capacitor 11a has the correct polarity and voltage for forced quenching of main thyristor 7d, the polarity now being the opposite of the one shown in FIG. 1. By commutation of the load current to bypass diode 8d, which takes place under the action of the windings of three-phase machine 1, a bypass circuit is closed and the current flows via bypass diode 8d, the current-carrying main thryistors, and the windings of motor 1. Now main thyristor 7d is fired, takes over the current, and completes the commutation. The commutation process between the other main thyristors of inverter 6 proceeds entirely analogously.

In the above explanations, the commutation process was explained for an inverter which has no device for limiting the current-dependent recharging. Since the current-dependent recharging leads to unduly high commutation voltages, especially in the event of an overload of the converter, commutating chokes 12a to 12c in the converter are shunted by energy-removing series circuits as the devices, which consist of series connected ohmic resistors 13a to 13c and two antiparallel-connected, controlled valves 15a, 16a to 15a, 16c. Thyristors are used as the controlled valves. The firing pulses of these thyristors come from control unit 18. To explain the limiting of current-dependent recharging in a converter according to the invention, reference is again made to FIGS. 2a to 2f and to the above-described commutation example. As already mentioned, bypass diode 8d becomes conducting at time $t_3$, whereby the potential at terminal 14a of inverter 6 changes from minus to plus, as shown in FIG. 2e. This potential change at output terminal 14a is sensed by pickup device 24a, which, at the instant of the potential change furnishes a reference signal at its output which is fed to control unit 18.

As can be seen in FIG. 2a, controlled valve 16a is fired by control unit 18 at time $t_5$, the delay between time $t_3$ and time $t_5$ being designated δ. Whereas, in the converter without a shunt for commutating choke 12a, the curent $i_{12a}$ in commutating choke 12a is the same as the current in commutating capacitor $i_{11a}$, in the circuit of FIG. 1, according to the invention, a current branching occurs at node 25, with the switching on of controlled vale 16a, and the relation $i_{12a} = i_{11a} + i_{13a}$ applies, where $i_{13a}$ is the current in ohmic resistor 13a. By switching on the controlled valve 16a, part of the energy content of commutating choke 12a is branched off into a bypass and consumed there, so that only the difference current $i_{11a}$ can be used for current-dependent recharging of commutating capacitor 11a. The recharging current $i_{11a}$, which flows in commutating capacitor 11a after controlled valve 16a is switched on, is shown by curve 21 in FIG. 2a. In this case the current-dependent recharging ends earlier, at time $t_6$. Then only the commutating voltage shown by solid curve 22 appears across commutating capacitor 11a at the end of the current-dependent recharging, process. Thus, at the end of the current-dependent recharging, the original commutating voltage $U_{c2}$ is re-established at commutating capacitor 11a for the next commutation, instead of the overvoltage $U_{c3}$.

As far as polarity and voltage are concerned, commutating capacitor 11a is now prepared for extinguishing main thyristor 7d. It is not necessary to explain this commutating process, since it proceeds quite analogously to the one just explained. In order to limit the current-dependent recharging under the scope of the quenching process of main thyristor 7d, controlled valve 15a, connected antiparallel to controlled valve 16a, is switched on, in this case, during the time interval of the current-dependent recharging.

The amount of energy branched off from commutating choke 12a can be influenced by changing the delay time δ. In case of very large load currents or an overload of the converter, a maximum reduction of the current-dependent charging is necessary, i.e., the delay time δ should go towards zero. Then the firing pulse of the respective controlled valve takes place without delay, after the arrival of the reference signal which signals the potential change and, thereby, the beginning of current-dependent recharging.

In the illustrative embodiment of FIG. 1, a three-phase current transformer 23 is provided for determining load currents; its output signal is fed to a rectifier 30 terminated by a load resistor. The output signal of rectifier 30 is fed to control unit 18. This output signal provides timely information as to the magnitude of the load currents $i_o$, so that after the arrival of the reference signal signaling the potential change at one of the output terminals 14a to 14c, firing pulses, suitably positioned in time, can be provided by control unit 18 to controlled valves 15a to 15c and 16a to 16c via a current-dependent time delay stage. The delays δ provided by the delay device decrease with the magnitude of the load current $i_o$.

Figure 3:
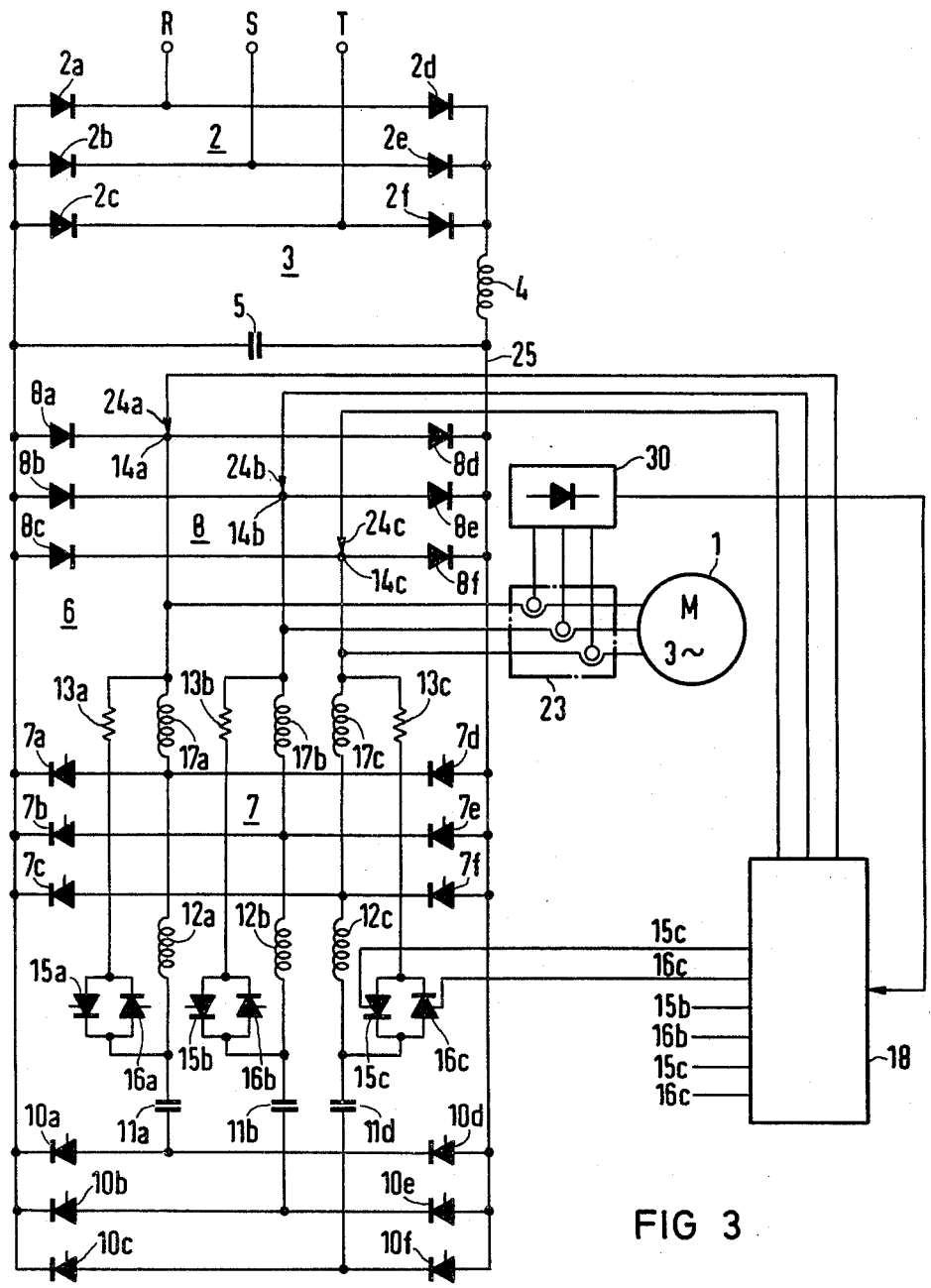
FIG. 3 is a schematic diagram of a commutation converter like that of FIG. 1, but having a choke connected between the common main terminal of two main thyristors and the main terminal of the associated bypass diodes.

The illustrative embodiment of the converter according to the invention shown in FIG. 3 differs from the one shown in FIG. 1 only by the provision of an additional choke between the common main terminal of two main thyristors and the main terminal of the associated bypass diodes. Thus, for example, the common terminal of bypass diodes 8a and 8d is connected, via choke 17a, to the common terminal of main thyristors 7a and 7d. The common main terminal 14b of the two bypass diodes 8b and 8e is connected, via a choke 17b, to the main terminal of main thyristors 7b and 7e. Similarly, a choke 17c is provided for the third phase of inverter 6. By means of chokes 17a to 17c, a so-called "circuit with blocking voltage" of inverter 6 is realized. When one of the main thyristors 7a to 7f is extinguished and the current is subsequently transferred to one of the bypass valves 8a to 8f, an opposing voltage is formed at choke 17a to 17c, which represents a negative blocking-voltage load for the just switched-off main thryistor, so that adequate recovery time is brought about.

In the illustrative embodiment shown in FIG. 3, the series circuit consisting of the ohmic resistor and antiparallel controlled valves is shunted across both chokes, i.e., the commutating choke as well as the additional choke. Thus, the series circuit consisting of ohmic resistor 13a and antiparallel controlled valves 15a and 16a shunts commutating choke 12a as well as additional choke 17a. This is done in the same way for the other phases. Thus, energy can be removed from the two chokes during the current-dependent recharging by switching on the associated controlled valve, and can be converted into thermal energy.

Figure 4:
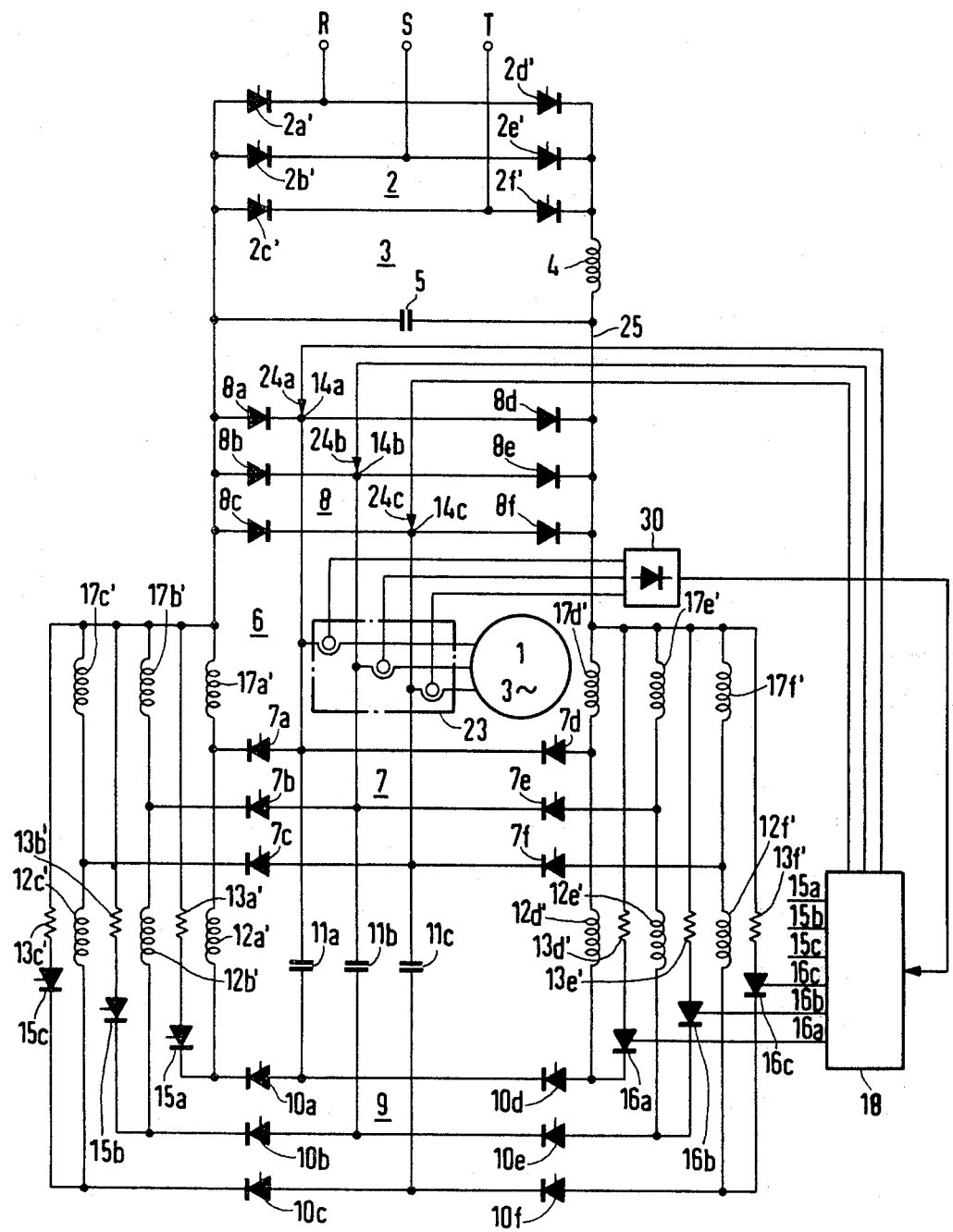
FIG. 4 is a schematic diagram of a converter having a variable intermediate link voltage.

The illustrative embodiment of FIG. 4 depicts a converter having variable intermediate-link voltage. To this end, rectifier 2 is designed with controlled semiconductor valves 2a' to 2f in the form of thyristors. For controlling the thyristors of rectifier 2, control units are used such as are decribed, for instance, in the book by G. Moeltgen "Netzgefuehrte Stromrichter mit Thyristoren", Siemens AG 1967, page 275.

Unlike the illustrative embodiments of FIGS. 1 and 3, a separate commutating choke is provided for each bridge arm in this inverter. Thus, commutating chokes 12a' to 12c' are connected between the cathodes of main thyristor-auxiliary thyristor pairs 7a, 10a to 7c, 10c. Commutating chokes 12d' to 12f' are connected between the anodes of main thryistor-auxiliary thyristor pairs 7d, 10d to 7f, 10f. Also the circuit of inverter 6 realized in FIG. 4 has blocking, via a separate additional choke 17a' to 17f', to the DC voltage terminals of bypass diode bridge 8. Additional chokes 17a' to 17f have a higher inductances than commutating chokes 12a' to 12f'.

In order to preclude the occurrence of overvoltages on capacitors 11a to 11c during current-dependent recharging, corresponding pairs of chokes, for example, commutating choke 12a' and additional choke 17a', are each shunted by a series circuit consisting of an ohmic resistor and a controlled valve, i.e., resistor 13a' and thyristor 15a. Thus, six shunt branches, being ohmic resistors 13a' to 13f' and controlled valves 15a to 16c, are provided. Controlled valves 15a to 15c as well as 16a to 16c are controlled in the same way as in the preceding embodiment examples. With the start of current-dependent recharging, recognized by the potential change at one of the output terminals 14a to 14a, energy is branched off from the series-connected choke participating in the current commutating process, matched to the magnitude of the load current, and delayed more or less by firing a shunt circuit, so that this energy is no longer available for the current-dependent recharging of commutating capacitors 11a to 11c.

Figure 5:
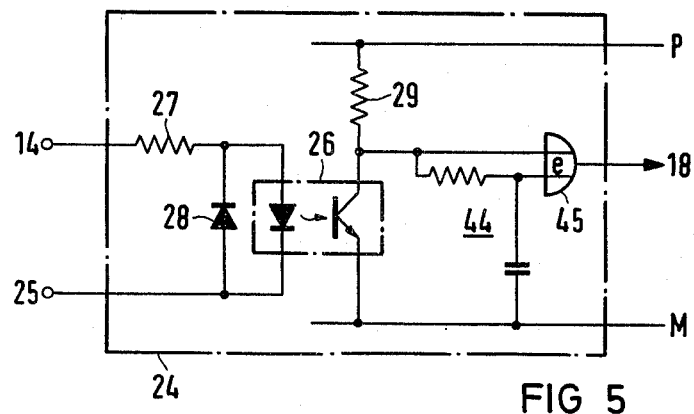
FIG. 5 is a schematic diagram of a pick up device for detecting potential charge at the output of a converter, according to the teachings of the invention.

FIG. 5 is an illustrative embodiment of a pickup device 24a to 24c useful for sensing the potential change at an output terminal 14a to 14c of an inverter 6 in one of the converters illustrated above. In it, one input of an optical coupler 26 is connected via a resistor 27 to one of the output terminals 14, and the other, to line 25 of the DC intermediate voltage circuit. A protective diode 28 is connected in parallel to the input of optical coupler 26. On the output side, the collector lead of optical coupler 26 is connected via a resistor 29 to a positive potential P of the power supply, for example, of the control circuitry. The emitter of optical coupler 26 is connected to chassis ground M of the control circuitry. The collector signal is fed, in one case directly, and, in another case, delayed by an R-C element 44, to the inputs of an EXCLUSIVE-OR gate 45. A short pulse is produced at the output of gate 45 for every potential change at 14, to which the length of the above-mentioned delay corresponds. These short pulses are fed to stage 39 in control unit 18 (See FIG. 8)

Figure 6:
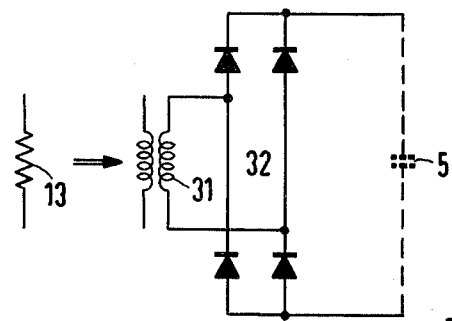
FIGS. 6 and 7 are schematic diagrams showing replacement of the ohmic resistors of the converters of FIGS. 1 and 3, and of FIG. 4, respectively, by current transformers.

In the illustrative embodiments described so far, it was assumed that the energy-removing device should comprise an ohmic resistor 13 and one or two controlled valves 15 and 16 connected in series therewith. FIG. 6 shows that a current transformer 31 can be inserted in the energy-removing device instead of ohmic resistor 13. Current transformer 31 feeds back the excess energy occurring during the current-dependent recharging to intermediate-link capacitor 5. The illustrative embodiment shown in FIG. 6 can be used in conjunction with the converters shown in FIGS. 1 and 3, where a common commutating choke is provided for each two bridge arms having a common main terminal. Since commutating choke 12 has different current flow directions here, depending on the bridge arm to be commutated, a full-wave rectifier 32 is required for rectifying the output signal of current transformer 31.

Figure 7:
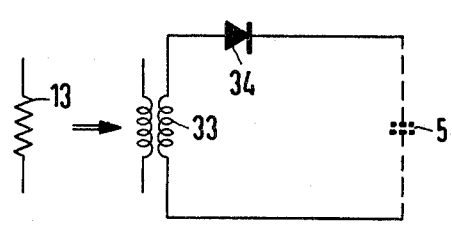

In FIG. 7, replacement of ohmic resistor 13 by a current transformer 33 and a rectifier diode 34 is shown. This circuit can be used for the illustrative embodiment of FIG. 4.

There, a separate commutating choke 12 is assigned to each bridge arm of inverter 6, and half-wave rectification, obtainable with rectifier diode 34, is sufficient.

In both cases, the energy removed from the commutating choke during the current-dependent recharging is fed back to the intermediate-link capacitor 5. Since the operation of the transformer is unipolar, a suitable demagnetizing arrangement must also be provided.

Figure 8:
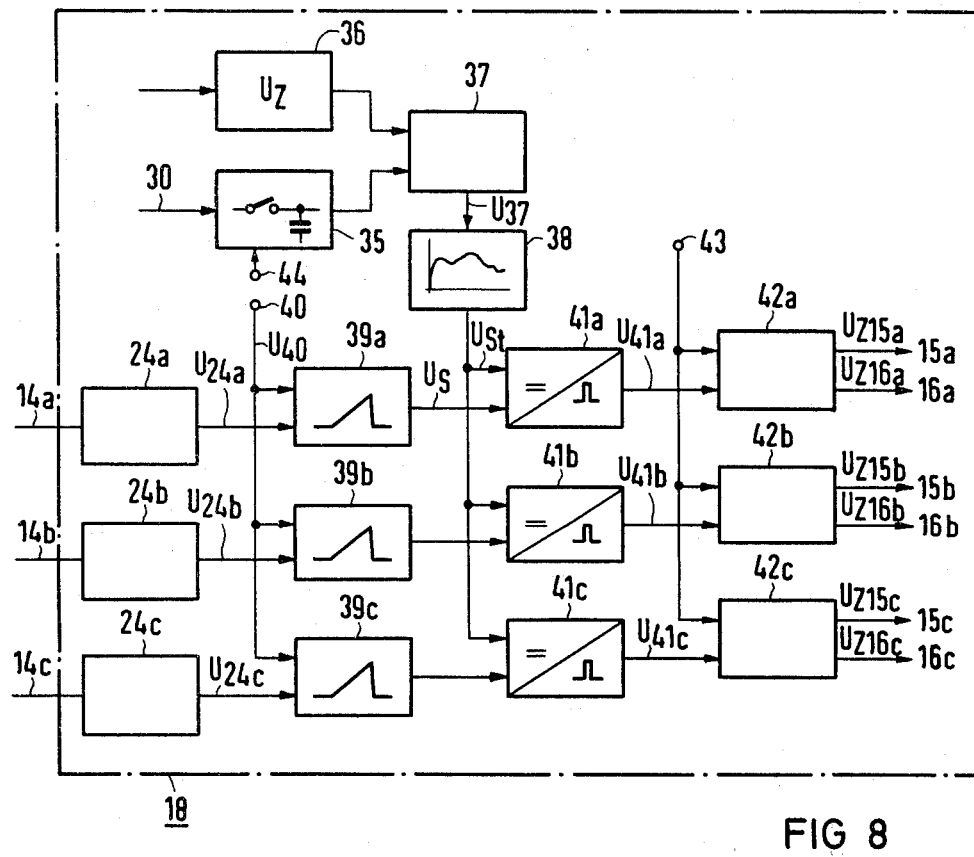
FIG. 8 is a block diagram of a drive unit useful with converters shown in preceding figures.

FIG. 8, lastly, shows a block diagram of an illustrative embodiment of a control unit 18. In block 35, the actual value of the current flowing at the start of commutation is measured by means of a sample-and-hold arrangement, which corresponds to the commutated current. The input signal for this purpose is the output signal of current transformer 23 rectified in rectifier unit 30. In the case of converters having variable intermediate-link voltage, control unit 18 also contains a block 36 for determining the intermediate link voltage $U_Z$. The output signals of blocks 35 and 36 are summed in block 37 and are evaluated; subsequently they are transformed in function generator 38 into a control voltage.

As already mentioned, a pickup device 24a, 24b, 24c for the potential change during a commutation is assigned to each output terminal 14a, 14b, 14c of inverter 6. Each of the pickup devices 24a, 24b, 24c in FIG. 8 is followed by a similar series of blocks performing like functions; explanation will therefore be limited to the example of pickup device 24a. The output of pickup device 24a is connected to a sawtooth generator 39a which is reset to zero by a signal fed via terminal 40 and the forward sweep of which is triggered by a pulse-shaped output signal $U_{24a}$ from pickup device 24a. A signal coming from the inverter control is always supplied via the terminal 40 when a quenching pulse is delivered to one of the quenching thyristors 10. The sawtooth voltage $U_S$ and the control voltage formed in funtion generator 38 are compared in comparator 41a, and a pulse $U_{41a}$ is generated when the voltages are equal. This pulse is fed to one input of firing stage 42a. The other input of firing stage 42a is connected to terminal 43, via which a signal indicating the polarity of the voltage at the commutating capacitor is supplied from the inverter control. Firing stage 42a delivers firing pulses $U_{Z15a}$ and $U_{Z16a}$ to controlled valves 15a and 16b in the energy removing device.

Figure 9:
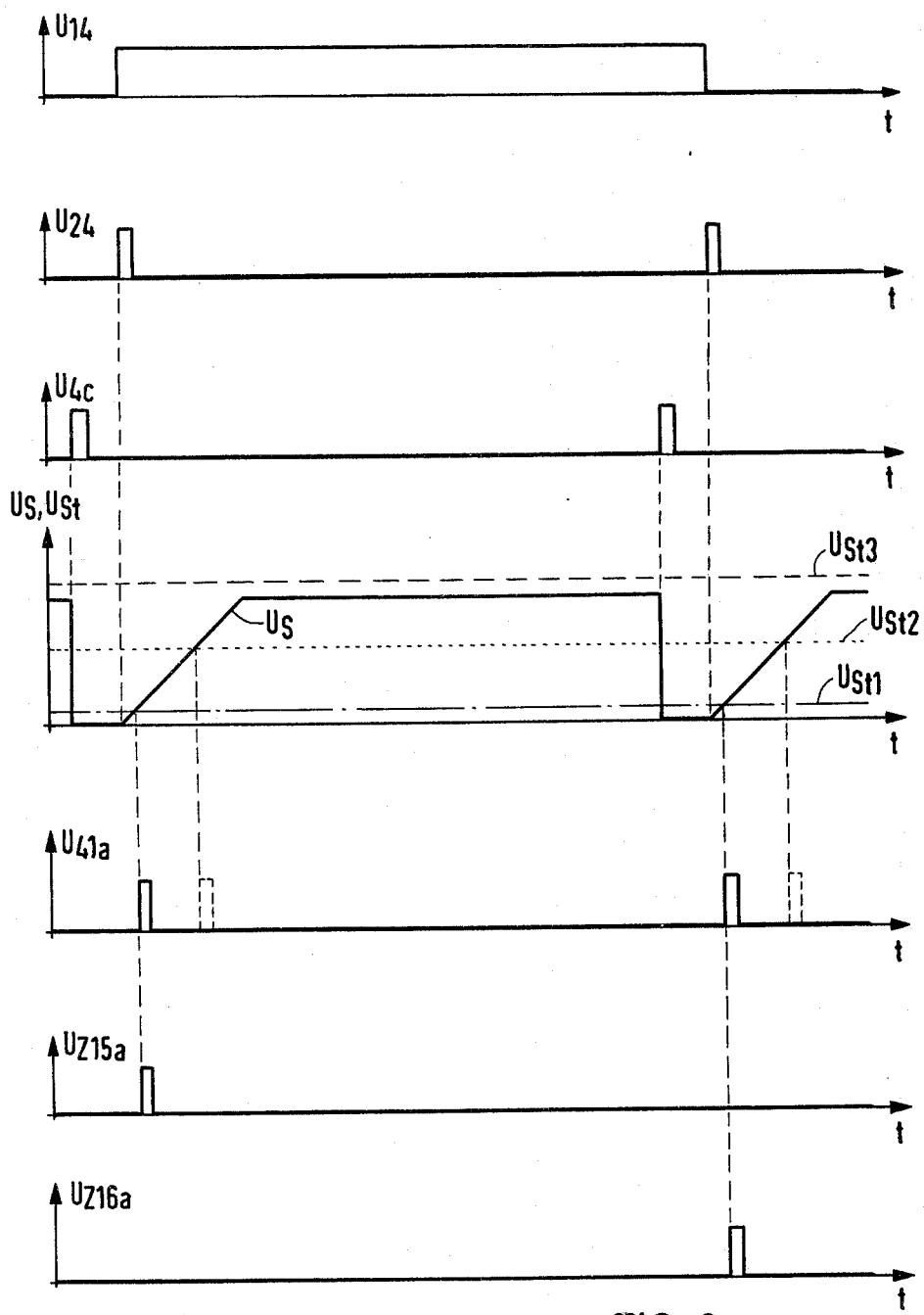
FIG. 9 shows waveform of signals occurring in the circuit of FIG. 8.

In the following, the operation of control unit 8 will be explained in conjunction with the pulse diagram shown in FIG. 9. The earliest time for firing controlled valves 15a to 15c and 16a to 16c of the energy-removing device is the start of the current-dependent recharging of the corresponding commutating capacitor 11; i.e., that instant at which a potential change occurs at an output terminal 14 at the junction between a main thyristor 7 and the associated bypass diode 8. This potential change always occurs after a quenching pulse is delivered to a quenching thyristor 10. After a quenching pulse belonging to a phase, $U_{40a}$, (FIG. 9) is formed, sawtooth generator 39a, for instance, is prepared, i.e., reset to zero. With the arrival of a pulse $U_{24a}$ from pickup device 24a, signaling the potential change at output terminal 14a, generation of sawtooth $U_S$ begins. The forward sweep time of sawtooth $U_S$ must correspond approximately to the control range of control unit 18, i.e., to about one-half of the duration of the reversal process. The sawtooth voltage $U_S$ is compared in comparator 41a with the control voltage voltage $U_{St}$. The delay between the potential change at corresponding output terminal 14a of inverter 6 and the delivery of a firing pulse to a controlled valve 15a or 16a of the energy-removing device is proportional to the magnitude of control voltage $U_{St}$. This illustrated in FIG. 9 by three control voltages $U_{St1}$, $U_{St2}$ and $U_{St3}$. Control voltage $U_{St3}$, which corresponds to a very small current in inverter 6, is so large relative to the amplitude of sawtooth voltage $U_S$ that no intersection comes about and the controlled valve of the energy-removing device is not fired. This makes sense, since for small currents there is no danger of peaking of the commutation voltage at the associated capacitor but, to the contrary, the current-dependent recharging is necessary for compensating the losses of the preceding commutation process. The pulses $U_{41a}$ delivered at the output of the comparator 41a are distributed to the controlled valves 15a to 16a after being appropriately amplified in the firing stage 42a depending on the polarity of the voltage at commutating capacitor 11a. The signal representing the polarity at the commutating capacitor 11a is taken from the inverter control and is fed to the firing stage 42a via the terminal 43.

To obtain the control voltage $U_{St}$, the instantaneous value of the current measured in the sample-and-hold device of the block 35 when the commutation is initiated by delivery of a quenching pulse, and, in the case of a converter with variable intermediate-link voltage, the intermediate-link voltage measured in block 36, are evaluated and added in block 37. For proper timing of the switching on of the sample-and-hold memory in block 37, the quenching pulses for quenching thyristors 10 are fed to the sample-amd-hold memory terminal 44.

The output signal $U_{37}$ of block 37 is therefore proportional to the value of the capacitor voltage without activating the energy-removing device. Function generator 38 compares the voltage $U_{37}$ with a reference voltage, below which firing pulses are not to be formed (operating point). The control voltage $U_{St}$ is then larger, as already mentioned, than the maximum voltage of the sawtooth $U_S$. With increasing output signal $U_{37}$, the control voltage $U_{St}$ becomes smaller and smaller, so that the firing instant approaches the beginning of current-dependent recharging more and more and, thereby, maximum energy removal from the commutating choke takes place.

In summary, it can be stated that, with the converter of this invention, overvoltage at commutating capacitors resulting from the current-dependent recharging can be reliably prevented. Energy is removed from the chokes in the commutation circuit, as required, by energy removing devices that can be connected to them. Through suitable choice of the instant at which this device is connected, exact control of the current-dependent recharing of the commutation capacitors is made possible. It can thereby be assured that the commutating capacitors always have a charge appropriate for commutation under all load and voltage conditions.

What is claimed is:

1. In a static frequency converter comprising an intermediate DC voltage link, a rectifier, and an inverter having main thyristors in a bridge circuit which are shunted by antiparallel bypass diodes in a bridge circuit, in which each bridge arm is shunted by a quenching circuit comprising a quenching thyristor, a commutating capacitor, and a commutating choke, there being a common commutating capacitor provided for each two bridge arms having a common main terminal, and in which a device for limiting the current-dependent recharging is employed, the improvement comprising:
    means for connecting an energy-removing device to each commutating choke to limit the current-dependent recharging after the occurrence of the potential change at the corresponding output termial of the inverter at the end of every commutaton.

2. A converter in accordance with claim 1 in which the energy-removing device comprises a series circuit consisting of an ohmic resistor and a controlled valve shunted across each commutating choke, the controlled valve being connected so that its forward direction is opposed to the direction of the current flow in the commutating choke during a commutation.

3. A converter in accordance with claim 1, in which the energy-removing device comprises a series circuit consisting of a constant-voltage sink and a controlled valve shunted across each commutating choke, the controlled valve being connected so that its forward direction is opposed to the direction of current flow in the commutating choke during a commutation.

4. A converter in accordance with claim 1, in which the energy-removing device comprises a series circuit consisting of a current transformer and a controlled valve shunted across each commutating choke, the controlled valve being connected so that its forward direction is opposed to the direction of current flow in the commutating choke during a commutation and the secondary winding of the current transformer being connected to the intermediate DC voltage link via a rectifier.

5. In a converter in accordance with one of the claims 1 to 4, the further improvement comprising:
    a pickup device coupled to each output terminal of the inverter for generating a reference signal at the time of the output potential change which occurs at the end of every commutation; and
    a control unit coupled to the controlled valves for delivering a firing pulse to the controlled valve associated with the commutating valve participating in the commutation process after arrival of a reference signal from the pickup device.

6. In a converter in accordance with one of the claims 1 to 5, having a common commutating choke for each two bridge arms having a common main terminal, the further improvement:
    comprising the energy-removing device having two antiparallel controlled valves.

7. In a converter in accordance with claim 6, in which an additional choke is arranged between each common main terminal of each two main thyristors and the corresponding main terminal of each two bypass diodes the further improvement comprising:
    the energy-removing device being shunt-connected with the additional choke as well as the commutating choke.

8. In a converter in accordance with one of claims 1 to 5, in which the rectifier is controlled and in which each quenching circuit is assigned a commutating choke and an additional choke is arranged between each main thyristor and the associated bypass diode, the further improvement comprising:
    the energy-removing device being connected in shunt with the additional choke as well as the commutating choke.

9. In a converter in accordance with one of claims 1 to 8, the further improvement comprising:
    the energy-removing device being a load current transformer and means, including a load connected to the current transformer, for generating a rectified signal for processing in the control unit so that the time interval between the reference signal and the firing pulse is increased with decreasing load current.

* * * * *